United States Patent [19]

Standish

[11] 4,307,395
[45] Dec. 22, 1981

[54] METHOD OF AND APPARATUS FOR RECORDING, STORING AND REPLAYING DYNAMOMETER DATA FROM A LIQUID WELL PUMP

[75] Inventor: Thomas R. Standish, Houston, Tex.

[73] Assignee: Delta-X Corporation, Houston, Tex.

[21] Appl. No.: 137,108

[22] Filed: Apr. 3, 1980

[51] Int. Cl.³ .......................... G06F 3/04; H04Q 9/02; G11B 5/02; G08C 19/28

[52] U.S. Cl. .............................. 340/870.11; 166/65 R; 346/33 WL; 360/32; 364/520

[58] Field of Search ...................... 340/870.11, 870.27; 364/520; 360/32; 166/65, 66, 113; 175/40; 346/33 WL; 33/1 M

[56] References Cited

U.S. PATENT DOCUMENTS

| | | | |
|---|---|---|---|
| 3,685,031 | 8/1972 | Cook | 360/32 |
| 3,838,445 | 9/1974 | Cupp et al. | 360/32 |
| 3,896,792 | 7/1975 | Vail et al. | 346/33 WL |
| 3,921,152 | 11/1975 | Hagar et al. | 166/65 R |

*Primary Examiner*—Thomas A. Robinson
*Attorney, Agent, or Firm*—Fulbright & Jaworski

[57] ABSTRACT

A method and apparatus for accepting analog voltage signals from a reciprocating liquid well pump and digitizing the signals and storing the signals for playback at a later time. A receiving circuit accepts two analog signals, one of which is proportional to the load in the polished rod, the other of which is proportional to the displacement of the polished rod. Simultaneously the two analog signals are digitized by means of an analog to digital converter and the digital data is stored on a digital memory integrated circuit. The digital memory may be replayed through a digital to analog converter into an x-y plotter. Digital latches and counters detect the start and end of a pumping cycle to insure that one full cycle of the reciprocating pump is stored in the digital memory. Timing circuitry strobes the load and displacement data into the digital memory in equal time increments to allow time related methematics to be performed by a computer. A circuit which accepts the digital memory, which may be separate from the recording device, formats the data and serially transmits the data in a form acceptable to a computer.

5 Claims, 2 Drawing Figures

METHOD OF AND APPARATUS FOR RECORDING, STORING AND REPLAYING DYNAMOMETER DATA FROM A LIQUID WELL PUMP

BACKGROUND OF THE INVENTION

Dynamometers have been used for many years to plot load versus position on reciprocating well pumps. Electronic dynamometers have more recently been introduced and employ a load cell and a position-variable potentiometer as input to an x-y plotter as disclosed in my co-pending patent application Ser. No. 06/089,844, entitled Control Circuit for Shutting Off the Electrical Power to a Liquid Well Pump. The resulting plot of position (x-axis) versus load (y-axis) is used to determine the amount of stress on the rods connecting to the pump; the amount of torque on the pumping unit gearbox; and for performing time related Fourier analysis in order to gain information about the downhole pump. Computer programs have been developed to perform these calculations. The traditional method for inputting data to these programs has been to choose data points from the plot and manually enter the data points into the program.

The present invention accepts the analog voltages from the load cell and position transducer as each is input into the x-y plotter and digitizes each signal and stores the data on an electronic digital memory. Control circuitry insures proper start/stop timing. Once the data is stored, the present invention allows the digital data to be replayed through a digital to analog converter onto the x-y plotter so that the operator can verify that the recorded data is correct. The present invention allows the memory card to be removed once the data is recorded and a second memory card inserted so that multiple recordings can be made on a single field trip. The present invention allows the memory card to be attached to a transmitting device, which may or may not be separate from the recording device. The transmitting device accepts the memory data and adds the necessary control characters and transmits the data serially at a rate acceptable to a computer.

SUMMARY

The present invention utilizes a control circuit which monitors the load and position signals input into an electronic dynamometer and detects the start of the upstroke and begins strobing data. The control circuitry then checks for the start of the upstroke a second time and stops strobing data when detected.

A further object of the present invention is the use of an internal timer which is used to control the data strobe rate. The internal timer serves to clock the data at even time increments so that time related mathematics can be performed by a computer. The internal timer also serves to provide a variable clock speed so as to maximize the number of data points strobed during one pump cycle for various pump speeds.

A further object of the present invention is the use of analog to digital converters to simultaneously convert the load and position analog voltages into digital signals which are weighed proportional to the analog voltage.

A further object of the present invention is the use of a digital memory to store the load and position data. The digital memory is constructed so as to allow the memory to be removed from the recorder without the loss of data in the memory so that a second memory can be added to the recorder and a second set of data recorded.

A further object of the present invention is the use of digital to analog converters which allow the data stored on the digital memory to be replayed onto the x-y plotter. The same internal timer used to strobe the data in is also used to strobe the digital data into the digital to analog converter so that the data is replayed onto the plotter at the same rate it was recorded.

A further object of the present invention is the use of control circuitry to transmit the data contained on the memory card to a computer. For convenience, the transmit circuitry may physically be located separate from the recording circuitry. The transmit circuitry accepts the data from the digital memory card and adds the necessary control bits such as start, stop and parity and transmits the data serially to a computer at a data rate which is selected by the operator as compatible with a computer.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
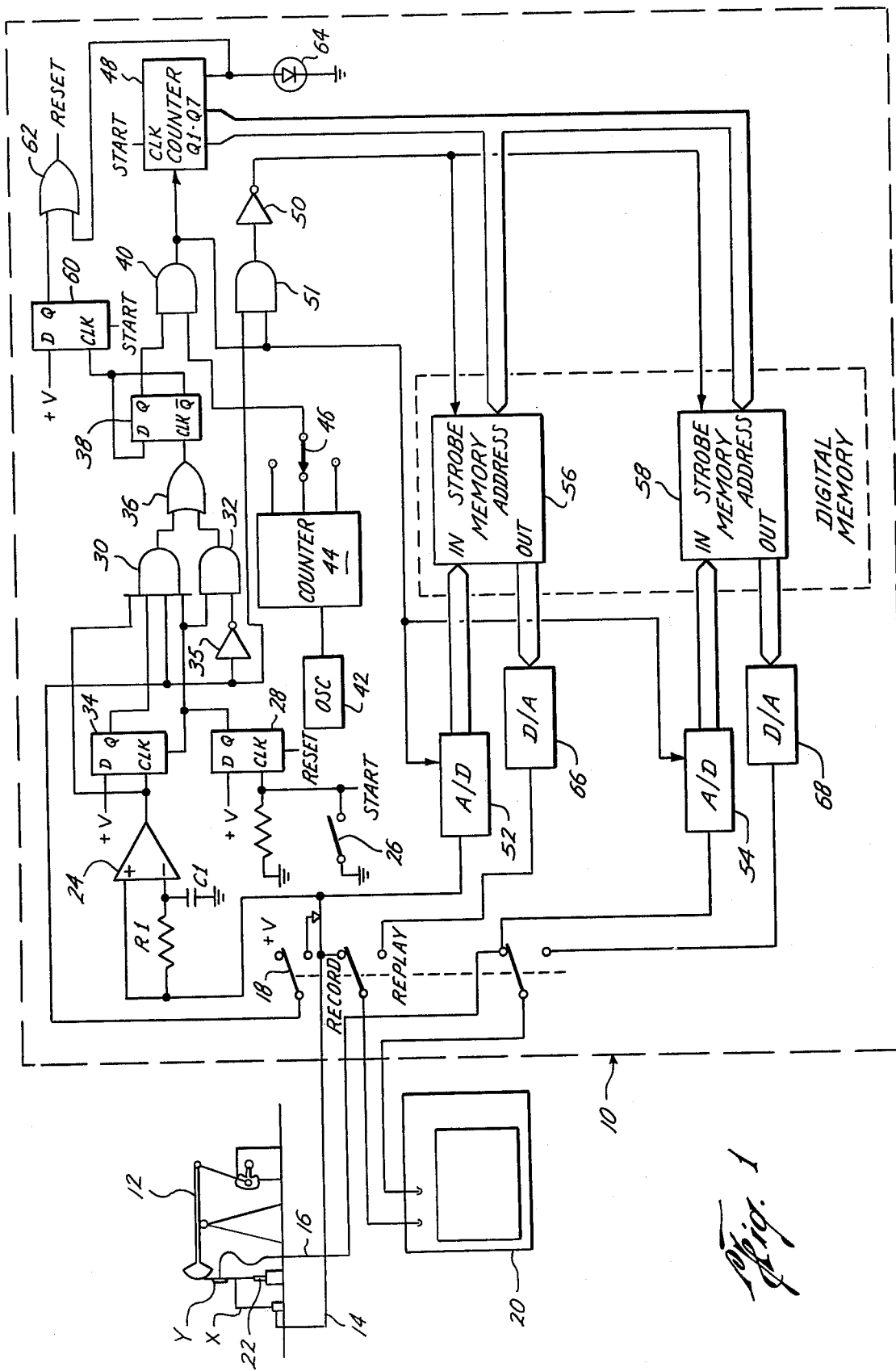
FIG. 1 is an electrical and mechanical schematic of the present invention for recording, storing and replaying data from a liquid well pump.

Referring now to FIG. 1, the reference numeral 10 generally indicates the control circuitry for recording, storing and replaying the analog data from a conventional oil well pumping unit 12. Electronic signal lines 14 and 16 supply the analog signals to switch 18 which, when placed in the record position, routes the analog signals to the x-y recorder (dynamometer) 20, which is used to plot load (y-axis) versus position (x-axis).

Two conventional transducers are attached to the pumping unit 12. The first is a load transducer Y which is attached to the polished rod 22 in such a manner as to provide a DC signal which is proportional to the load on the rod. The second is the position transducer X which consists of a device such as a potentiometer which is mechanically connected to the polished rod 22 of the pumping unit 12. The position transducer X gives a voltage output which is proportional to the vertical position of the pumping unit 12.

The signal from the position transducer X is input through line 14 into the positive input of comparator 24 and to one side of resistor R1. Capacitor C1 acts as a time delay to the signal passing through resistor R1 so that the signal on the negative input of comparator 24 will always slightly lag the signal on the positive input of comparator 24. The voltage from position transducer X increases positive as the pumping unit moves in the upward direction so that the voltage on the positive input of comparator 24 is greater than the voltage on the negative input of comparator 24 causing comparator 24 to output a positive voltage (logic 1). As the pumping unit moves in the downward direction, the voltage from position transducer X decreases to the original starting voltage. The decreasing voltage causes the positive input of comparator 24 to be less than the negative input of comparator 24 which switches the output of comparator 24 to a zero voltage (logic 0). The result of this action is a square wave output from comparator 24, the frequency of which is equal to the cyclic speed of the pumping unit 12. The rising edge of the square wave will coincide with the start of the upward movement of the pumping unit 12 and the falling edge of the square wave will coincide with the start of the downward movement of the pumping unit 12.

When the analog voltages are to be recorded, the operator presses switch 26 which places a positive signal on the clock input of D-type latch 28. The D input of latch 28 is fixed at a positive voltage (logic 1) so that the Q output of latch 28 changes to a logic 1. The Q output of latch 28 places a logic 1 on the input of AND gate 30 and on one input of AND gate 32 and to the reset input of D-type latch 34. Switch 18 is placed in the record position which places a logic one on AND gate 30, a logic one on AND gate 51, and a logic one on inverter 35. The output of inverter 35 is a logic zero which is input to AND gate 32 which forces the output of AND gate 32 to remain at a constant logic zero. When the pumping unit begins the start of the upstroke, the output of comparator 24 switches to a logic one which clocks on D-type latch 34 and places a logic one on the last of the four inputs of AND gate 30 which switches to a logic one. The logic one on the output of AND gate 30 passes through OR gate 36 and clocks D-type latch 38. D-type latch 38 is configured in a switching mode in that the $\overline{Q}$ output is connected to the D input. At startup, the $\overline{Q}$ output is a logic one which places a logic one on the D input so that the next clock pulse clocks the Q output to a logic one and the $\overline{Q}$ output to a logic zero. When D-type latch 38 clocks on the Q output changes to a logic one which places a logic one on one input of AND gate 40.

Oscillator 42 forming part of a timing or clock means is a free running multivibrator which is input to counter 44. Counter 44 is used to divide down oscillator 42 output and to allow operator selectable speeds. The speed selections are required due to the variations in speeds of pumping units 12. Switch 46 is used to select the proper speed. Switch 46 is input to AND gate 40 and when AND 40 is enabled, the clock pulses pass through AND gate 40 and are input to counter 48, AND gate 51 and analog to digital converters 52 and 54. The rising edge of the clock pulse allows the analog to digital converters 52 and 54 to begin converting. Analog to digital converter 52 accepts the analog position data from transducer X and converts it into an eight bit binary digital output, the value of which is proportional to the analog voltage input. Analog to digital converter 54 performs the same function on the analog load data from transducer Y. The rising edge of the clock pulse advances counter 48. The output of counter 48 is input into the address lines of RAM memories 56 and 58. The memory locations are then advanced with each clock pulse so that each successive conversion is stored in the next memory location. The result of the rising edge of the clock output of AND gate 40 is the start of the conversion of the analog to digital converters 52 and 54 and the advance of the memory location counter in memories 56 and 58. The fall of the clock output causes the output of inverter 50 to have the rising edge of the clock pulse which is input into the data strobe input of the memories 56 and 58. The duty cycle of the clock pulse is sufficiently long enough to allow the analog to digital converters 52 and 54 to finish converting and the memory counter to be settled before the fall of the clock pulse. The fall of the clock pulse clocks the digital data into the memories 56 and 58. Data is gathered into the memories 56 and 58 on equal time increments by each clock pulse through the pump cycle.

On the start of the next upstroke comparator 24 again switches from a logic zero to a logic one which clocks D-type latch 38. The Q output of D-type latch 38 is clocked from a logic one to a logic zero which places a logic zero on one input of AND gate 40 which stops the clock pulses from counter 44. The $\overline{Q}$ output of D-type latch 38 is clocked from a logic zero to a logic one which is input into the clock input of D-type latch 60. The Q output of latch 60 is clocked to a logic one which passes through OR gate 62 and is used to reset D-type latch 28. A logic one on the reset of D-type latch 28 forces the Q output to a logic zero which halts the recording sequence. The Q output of D-type latch 60 remains at a logic one until the start button 26 is pressed which allows the recording sequence to start over.

An error condition exists when the memory locations in memories 56 and 58 fill before the pumping unit 12 completes one full pump cycle. This results when switch 46 is set on a too fast setting for the speed of the pumping unit 12. When counter 48 has incremented to the complete count, the next clock pulse causes the counter 48 to overflow which sets the overflow output of counter 48 to a logic one. The logic one from the overflow output of counter 48 is input to light emitting diode 64 which illuminates to indicate an error exists. The overflow signal also passes through OR gate 62 to the reset of D-type latch 28 which is reset to logic zero as previously described. The error condition is removed by pressing the start button 26.

When switch 18 is placed in the replay position, the x input of plotter 20 receives the analog output of digital to analog converter 66 and the y input of plotter 20 receives the output from digital to analog converter 68. Switch 18 in the replay position places a logic zero on the input to AND gate 30, AND gate 51 and inverter 35. The output of inverter 35 is a logic one which places a logic one on one input of AND gate 32. When push button 26 is pressed, the Q output of D-type latch 28 switches to a logic one which passes through AND gate 32 and OR gate 36 and clocks on D-type latch 38 which places a logic one on one side of AND gate 40 which allows the clock pulses from counter 44 to pass through. The clock pulses from AND gate 40 are input to counter 48 whch advances the data stored in the memories 56 and 58. The data output of memories 56 and 58 are input to digital to analog converters 66 and 68, respectively. The output of digital to analog converter 66 is an analog voltage which is input to the x input of x-y plotter 20. The output of digital to analog converter 68 is an analog voltage which input to the y input of x-y plotter 20. The result is a reproduction of the data previously recorded and stored in memories 56 and 58. Counter 48 continues to count until the entire memory has been read and the overflow output of counter 48 goes to a logic one and resets the logic as previously described.

Figure 2:
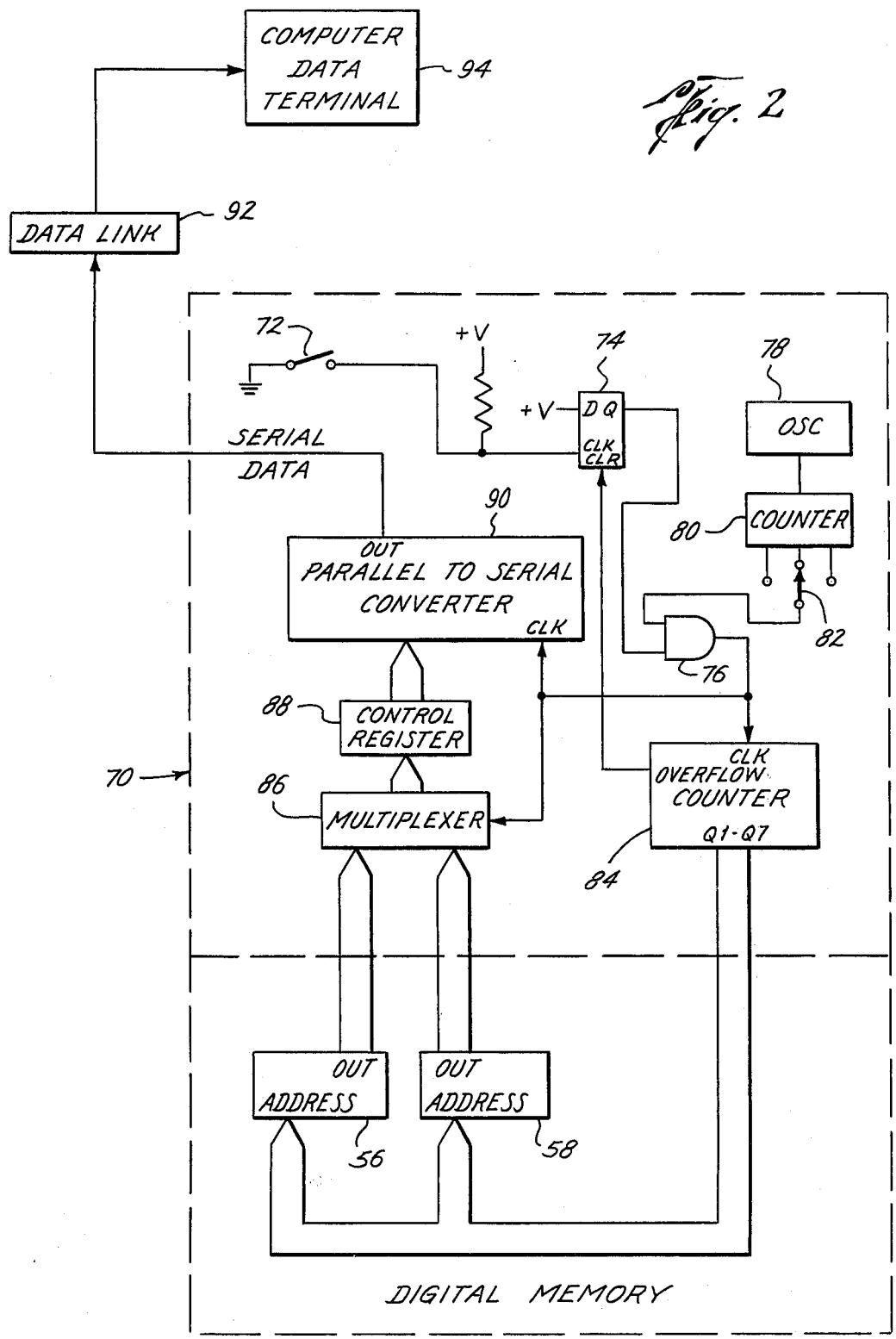
FIG. 2 is an electrical schematic of the present invention for transmitting the stored data in a form suitable for a computer.

The circuitry for transmitting the data stored in the memory into a computer is shown in FIG. 2. The circuitry of FIG. 2 may be physically located with the circuitry of FIG. 1 or it may be separate. The preferred embodiment is to have the circuitry separate. Referring to FIG. 2, memory components 56 and 58 are removed from the circuitry of FIG. 1 and are connected to the circuitry 70 of FIG. 2 via a mutually compatible connector.

To start the data transmission, the operator presses push button 72 which is input into the clock input of D-type latch 74. The Q output of latch 74 clocks to a logic one which enables AND gate 76. Oscillator 78 provides a constant clock input into counter 80. The output of counter 80 is three operator selectable frequencies which provide the basic timing for the data output. The timing provides for selectable serial data transmission rates of 110, 300, and 1200 bits per second by switch 82. The output of counter 80 passes through AND gate 76 and into counter 84 which advances the address of the memories 56 and 58 with each clock pulse. The output of the memories 56 and 58 is input into a multiplexer 86 which is advanced by the clock pulse from AND gate 76. The function of multiplexer 86 is to separate the eight data bits of memory 56 and the eight data bits of memory 58 into data words of two bits, three bits and three bits. The output of the two or three data bits are input into control character register 88 which adds the necessary characters to make a standard US ASCII numeric character. The output of control character register 88 is three octal base ASCII digits for each eight bits of memory data. Reformatting the data into standard ASCII numeric digits allows the data to be acceptable to all forms of computers. The output of control character register 88 is input into parallel to serial converter 90 which serializes the data for output to an external data link 92 for transmission to computer data terminal 94.

The data is output serially until counter 84 counts the full amount of data available from the memory 56 and 58. The next clock pulse sets the overflow output of counter 84 which places a logic one on the clear input of D-type latch 74 which resets the Q output to a logic zero and disables AND gate 76.

The present invention, therefore, is well adapted to carry out the objects and attain the ends and advantages mentioned as well as others inherent therein. While a presently preferred embodiment of the invention has been given for purpose of disclosure, numerous changes in the details of construction and arrangement of parts will readily suggest themselves to those skilled in the art and which are encompassed within the spirit of the invention and the scope of the appended claims.

What is claimed is:

1. An apparatus for recording and storing data of the load versus position of a polished rod which reciprocates a liquid well pump comprising,
   a load transducer connected to the polished rod for providing an analog signal proportional to the load on the rod,
   a position transducer connected to the polished rod for providing an analog signal proportional to the position of the rod,
   a measuring circuit including a comparator having two inputs adapted to be connected to the position transducer for measuring the start and end of one full cycle of the reciprocation of the pump,
   an analog to digital converter adapted to be connected to each of the transducers for converting the analog signals to digital signals,
   a digital memory connected to each of the converters for storing the digitized signals,
   an x-y plotter for recording analog signals on the plotter,
   a digital to analog converter connected to the output of each of the memories and adapted to be connected to the x-y plotter for replaying the data stored in the memories on the x-y plotter,
   switching means connected to the transducers, measuring circuit and digital to analog converters for recording the analog signals from the transducers in digital form and for replaying the data stored in memories on the x-y plotter, and
   variable timing means for maximizing the amount of data collected regardless of pump speed and having an output connected to and controlled by the measuring circuit and connected to the address of the memories and to the analog to digital converters for storing the digitized signals to and replaying the digitized signals from the memories in equal time increments.

2. The apparatus of claim 1 wherein one of the inputs to the comparator includes an RC delay circuit.

3. The apparatus of claim 1 including,
   an error indicator connected to the timing means to indicate when the memories are full before the pump completes one full cycle.

4. The apparatus of claim 1 wherein said timing means includes,
   an oscillator,
   a counter connected to the oscillator output, said counter having a plurality of different value outputs, and
   switch means connected to said counter outputs for selecting a desired timing signal.

5. The apparatus of claim 1 including means for transmitting the recorded digitized data in the memories to a computer for processing comprising,
   timing means connected to the address of each memory,
   said output of each memory connected to a multiplexer,
   a control character register connected to the output of the multiplexer for converting the data into standard numeric characters, and
   a parallel to serial converter connected to the output of the register for serializing the data for output to a computer.

* * * * *